US011845318B2

(12) United States Patent
Schlager et al.

(10) Patent No.: US 11,845,318 B2
(45) Date of Patent: Dec. 19, 2023

(54) MODULAR RANGE EXTENDER HAVING THERMAL COUPLING WITH A CABIN MODULE OF AN ELECTRIC VEHICLE

(71) Applicant: MAGNA INTERNATIONAL INC., Aurora (CA)

(72) Inventors: Gerd Schlager, Kefermarkt (AT); Martin Winter, Dietach (AT); Nicolai Schmölzer, Garsten (AT); Johannes Winklinger, Linz (AT)

(73) Assignee: MAGNA INTERNATIONAL INC., Aurora (CA)

( * ) Notice: Subject to any disclaimer, the term of this patent is extended or adjusted under 35 U.S.C. 154(b) by 465 days.

(21) Appl. No.: 17/271,741

(22) PCT Filed: Aug. 29, 2019

(86) PCT No.: PCT/CA2019/051199
§ 371 (c)(1),
(2) Date: Feb. 26, 2021

(87) PCT Pub. No.: WO2020/041884
PCT Pub. Date: Mar. 5, 2020

(65) Prior Publication Data
US 2022/0348050 A1    Nov. 3, 2022

Related U.S. Application Data

(60) Provisional application No. 62/724,377, filed on Aug. 29, 2018.

(51) Int. Cl.
*B60H 1/00* (2006.01)
*B60H 1/08* (2006.01)

(52) U.S. Cl.
CPC ..... *B60H 1/00271* (2013.01); *B60H 1/00392* (2013.01); *B60H 1/08* (2013.01); *B60H 2001/00307* (2013.01)

(58) Field of Classification Search
CPC .. B60H 1/00271; B60H 1/00392; B60H 1/08; B60H 2001/00307; F01P 2050/24;
(Continued)

(56) References Cited

U.S. PATENT DOCUMENTS

2006/0113071 A1   6/2006   Weible
2013/0140001 A1   6/2013   Mandl

FOREIGN PATENT DOCUMENTS

CN   106364282 A   2/2017
CN   107284187 A   10/2017
(Continued)

*Primary Examiner* — Emmanuel E Duke
(74) *Attorney, Agent, or Firm* — Dickinson Wright PLLC

(57) ABSTRACT

A system for transferring waste heat from a range extender module of an electric vehicle to a cabin module includes a cooling circuit in the range extender module and a heating circuit of the cabin module. The cooling circuit is thermally coupled to the heating circuit. The cooling circuit includes a thermal coupler and the heating circuit includes a corresponding thermal coupler. The thermal coupler of the cabin module heating circuit may be disposed at the rear of the cabin module, and the thermal coupler for the cooling circuit of the range extender module may be disposed at the front of the range extender module. The thermal coupler of the range extender module may be longitudinally adjustable.

20 Claims, 1 Drawing Sheet

(58) Field of Classification Search
CPC ......... F01P 3/20; F01P 2060/08; B60K 11/02; B60L 2270/46; B60L 50/62
See application file for complete search history.

(56) References Cited

FOREIGN PATENT DOCUMENTS

| | | | | |
|---|---|---|---|---|
| CN | 207388799 U | 5/2018 | | |
| CN | 108116192 A | 6/2018 | | |
| CN | 1081161952 A | 6/2018 | | |
| DE | 102012217602 A1 * | 3/2014 | ................ | F01P 3/20 |
| DE | 102016224484 A1 * | 6/2018 | ......... | B60H 1/00392 |
| DE | 102016224484 A1 | 6/2018 | | |
| EP | 2338718 A1 | 6/2011 | | |
| JP | 2014125007 A | 7/2014 | | |
| JP | 2014144757 A | 8/2014 | | |
| WO | 2008147305 A1 | 12/2008 | | |
| WO | 2013167267 A2 | 11/2013 | | |
| WO | WO-2013167267 A2 * | 11/2013 | ............ | B60L 11/126 |

* cited by examiner

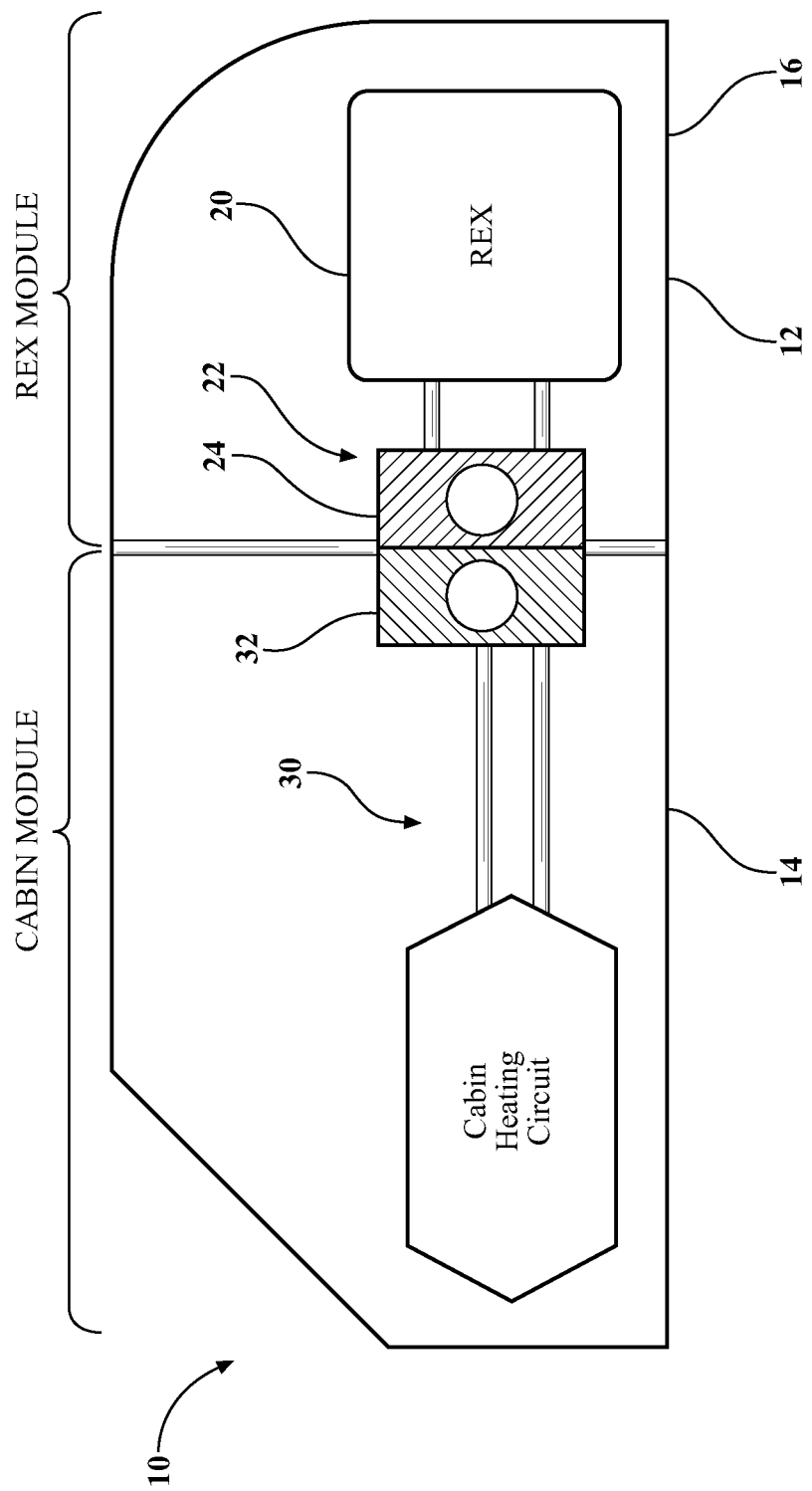

MODULAR RANGE EXTENDER HAVING THERMAL COUPLING WITH A CABIN MODULE OF AN ELECTRIC VEHICLE

CROSS-REFERENCE TO RELATED APPLICATION

This U.S. National Stage Patent Application claims the benefit of PCT International Patent Application Serial No. PCT/CA2019/051199 filed Aug. 29, 2019 entitled "Modular Range Extender Having Thermal Coupling With A Cabin Module Of An Electric Vehicle" which claims the benefit of and priority to U.S. Provisional Patent Application Ser. No. 62/724,377 filed on Aug. 29, 2018, titled "Modular Range Extender Having Thermal Coupling With A Cabin Module Of An Electric Vehicle," the entire disclosures of which are hereby incorporated by reference.

TECHNICAL FIELD

The present disclosure relates to modular range extenders. More particularly, the present disclosure relates to thermal connections between modular range extenders and a cabin module heating circuit.

BACKGROUND OF THE DISCLOSURE

Traditional passenger vehicles, such as automobiles having an internal combustion engine, are in common use. Such vehicles use combustible gasoline that is converted into energy to drive the vehicle engine. Use of internal combustion engines results in what is often referred to as waste heat, which is the heat generated by the engine. Waste heat is commonly used as a way to heat to heat the vehicle cabin, in particular during winter months.

Typically, engine coolant is routed through the vehicle system, where heat from the engine is transferred to the coolant lines. The coolant may be routed to a cabin heating circuit, which may include a radiator disposed adjacent the front of the vehicle cabin. The hot coolant can be transferred to the vehicle cabin via vents and a blower to force warm air into the cabin to increase passenger comfort. The level of heat can be controlled via valves or other mechanisms to produce a desired temperature or heat level in accordance with passenger demand.

Waste heat is also generated by electric vehicles, whether purely electric vehicles or hybrid vehicles. Some electric vehicles include integrated range extenders in the form of a supplemental combustion engine that may be actuated to convert gasoline or other fuel into energy to power the vehicle in instances where the battery has become depleted to limit instances of the vehicle running out of power before it can be charged again. Electric vehicles, whether including a range extender or not, also include a cabin heating circuit for heating the cabin, in particular in the winter months. In some cases, the heat is provided by the battery, thereby reducing the overall range capacity of an electric vehicle during trips in which cabin heating is desirable.

Additionally, electric vehicles may also be fitted with a modular range extender. Modular range extenders can be integrated into the rear axle module of the vehicle, thereby allowing for an efficient conversion of an existing electric vehicle platform without a range extender to include range extending capability. In these cases, the layout and structure of the existing design may not include the ability to easily account for the waste heat generated by the engine of the range extender module. The cabin heating circuit remains at the front of the vehicle and is designed to heat the cabin from the main battery. The waste heat at the rear of the vehicle is not utilized for cabin heating.

In view of the foregoing, there remains a need for improvements to module range extenders and vehicles design to use a modular range extender.

SUMMARY OF THE INVENTION

A system for thermally coupling a cooling circuit of a range extender module to a heating circuit of a cabin module is provided. The system includes a range extender module including a cooling circuit for transferring heat away from the range extender module and a cabin module including a heating circuit for transferring heat to the vehicle cabin.

The system further includes a first thermal coupling element connected to the cooling circuit of the range extender module and a second thermal coupling element connected to the heating circuit of the cabin module. The first coupling element mates with the second coupling element for conducting heat therebetween.

In one aspect, the range extender module is a rear axle module.

In another aspect, the range extender module is coupled to the cabin module via a DC/DC connection.

In one aspect, the first thermal coupling element is a rear thermal coupling element and the second thermal coupling element is a front thermal coupling element, and the rear thermal coupling element is disposed rearward relative to the front thermal coupling element.

In one aspect, the range extender module includes a combustion engine.

In one aspect, waste heat generated by the combustion engine is transferred to the cooling circuit of the range extender module and is further transferred to the heating circuit of the cabin module.

In one aspect, the first thermal coupling element and the second thermal coupling element are solid bodies and are joined together.

In one aspect, heat is transferred between the first and second thermal coupling elements via thermal contact conductance.

In one aspect, the first thermal coupling element is adjustable relative to the range extender module to accommodate coupling with the second thermal coupling element.

According to another aspect of the disclosure, a method for transferring waste heat from a range extender module to a cabin module is provided. The method includes generating waste heat in a range extender module of an electric vehicle and cycling the waste heat through a cooling circuit of the range extender module.

The method further includes transferring the waste heat from the cooling circuit to a heating circuit of a cabin module of the vehicle, where the heat is transferred via a thermal coupling between the cooling circuit and the heating circuit, and heating the heating circuit in response to transferring the waste heat. The method also includes cycling the heat in the heating circuit through the cabin module.

In one aspect, the method includes transferring heat from the cooling circuit to the heating circuit via thermal contact conductance.

In one aspect, the method includes operating an internal combustion engine of the range extender module to generate the waste heat.

In one aspect, the range extender module is a rear axle module.

In one aspect, the range extender module includes a first thermal coupling element and the cabin module includes a second thermal coupling element.

In one aspect, the method includes attaching the first thermal coupling element to the second thermal coupling element.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic view illustrating thermal integration of a range extender module with a cabin module.

DESCRIPTION OF THE ENABLING EMBODIMENT

Referring to FIG. 1, a system 10 for integrating a range extender module 12 with a vehicle cabin module 14 is provided. The range extender module 12 is preferably in the form of a rear axle module 16 that forms a portion of the vehicle chassis and drivetrain. In one form, the vehicle is an electric vehicle. For purposes of discussion, the rear axle module 16, including the range extender module 12 will be described as a separate component from the remainder of the vehicle, which shall be referred to as the vehicle cabin module 14. Additional vehicle structure, such as the vehicle body and other connected components, will not be described in detail.

The range extender module 12 may be coupled to the vehicle cabin module 14 in a manner known in the art in accordance with the expected application profile. In one approach, the range extender module 12 is integrated into the rear axle module 16. The rear axle module 16 may include additional functionality beyond using the range extender module 12 for additional power. For example, the rear axle module 16 may include steering control, all-wheel drive capability, suspension, traction control, braking, and the like. Such structure and functionality is known in the art and the details of this will not be described in detail.

The range extender module 12 may include a range extender unit 20 that is coupled to the rear axle module 16 in addition to the other known rear axle structure. The range extender unit 20 may include a fuel tank and a combustion engine for providing the range extension capabilities. The range extender module 12 is connected to the cabin module via a DC/DC connection, such that energy or current generated by the range extender unit can flow to the main battery in the cabin module 14 for driving the vehicle as desired.

The range extender module 12 may further include a cooling circuit 22. The cooling circuit 22 operates in a manner similar to a traditional cooling circuit, in which coolant is used to transfer heat away from the combustion engine. In a traditional range extension module, the heat from the cooling circuit (the waste heat) is radiated out to the environment in a traditional manner. In the present embodiment of the ranger extender module 12, the waste heat is transferred to the heating circuit of the cabin module 14.

The range extension module includes a rear thermal coupling element 24 that is part of the cooling circuit 22 of the range extender module 12. It will be appreciated that in some cases the range extension module may be integrated into another structure other than a rear axle module, so reference to the rear is done for ease of discussion, and should not be interpreted as limiting the thermal coupling to rear applications.

The rear thermal coupling element 24 is sized and arranged to mate with and cooperate with a corresponding thermal coupling element of the cabin module 14. Accordingly, heat from the coolant in the range extension module 12 may be transferred to the cabin module 14 via the rear thermal coupling element 24.

The cabin module 14 may include various vehicle structure not included in the rear axle module 16. For example, the cabin module 14 may include the front axle, various electric vehicle structure, and the vehicle cabin itself. The cabin module 14 includes a cabin heating circuit 30 similar to a traditional cabin heating circuit. The cabin heating circuit 30 generates heat that is transferred to coolant and routed to a radiator or the like near the front of the vehicle cabin, where the heat from the hot coolant is distributing into the vehicle cabin, thereby cooling the coolant, which returns to a heat source to be re-heated and re-routed through the heating circuit.

In the present approach, the cabin heating circuit includes a front thermal coupling element 32. The front thermal coupling 32 is sized and arranged to couple with and cooperate with corresponding structure of the rear thermal coupling element 24, such that heat can be transferred from the rear thermal coupling element 24 to the front thermal coupling element 32.

The rear and front thermal coupling elements 24 and 32 are coupled together such that heat from the cooling circuit 22 of the range extender module 12 may be transferred to the heating circuit 30 of the cabin module 14. Thus, hot coolant from the range extender module 12 is cooled and the cold coolant from the cabin module 14 is heated.

The heating circuit 30 of the present embodiment will extend along the cabin module 14 to a point adjacent the range extender module 12. In the above described embodiment where the range extender module is integrated into the rear axle module 16, the heating circuit 30 extends to the rear of the cabin module 14, such that the front thermal coupling element 32 may be disposed near the rear thermal coupling element 24.

In one approach, heat may transferred from the cooling circuit 22 to the heating circuit 30 by thermal contact conductance. In this approach, the rear thermal coupling element 24 is a solid body and the front thermal coupling element 32 is a solid body. The thermal coupling elements 24 and 32 are preferably joined together to maximize the contact pressure between corresponding mating surfaces. The coupling elements may be joined together in a number of ways to maximize the contact pressure and conductive heat transfer between the two. For example, the coupling elements 24 and 32 may be clamped together, or they may be pressed together and held in place by one or more bolts. Alternatively, the coupling elements may be threaded together.

Due to manufacturing tolerances, the exact point of contact between the thermal coupling elements 24, 32 is not known with a high degree of precision. The modular nature of the rear axle module 16 with integrated range extender module 12 is such that the cooling circuit 22 and rear coupling element 24 are manufactured prior to installation with the cabin module 14. Similarly, the heating circuit 30 of the cabin module 14, and the front thermal coupling element 32, are also pre-defined. Modular attachments of components is well known in the art, frequently utilizing flexible wire harness for transferring current or signals between modules. In other instances, sliding connections may be used to account for tolerance stack up between modules.

In one approach, the thermal coupling elements 24 and 32 include longitudinal compensation to account for these tolerances. In one approach, a coupling surface of the front coupling element 32 is longer than the coupling surface of the rear coupling element 24, such that the rear coupling element 24 may still transfer a high amount of heat from its circuit. In another approach, the coolant lines of the cooling circuit 22 are routed in a spiraling pigtail type pattern, allowing for longitudinal flexing such that the coupling elements 24 and 32 may be mated. Other types of longitudinal compensation for the coupling elements 24 and 32 may also be used, if desired.

By transferring the waste heat from the range extender module 12 to the heating circuit 30 of the cabin module 14, cabin module energy may be conserved relative to a system where the waste heat is radiated out of the vehicle. By conserving the cabin module energy, especially during winter months, the range of the vehicle may be extended further relative to a system that does not transfer the waste heat. The use of the waste heat with the heating circuit 30 reduces the need of the cabin module to use energy for eat, and can use this energy instead to drive the vehicle.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for thermally coupling a cooling circuit of a range extender module to a heating circuit of a cabin module, the system comprising:
   a range extender module including a cooling circuit for transferring heat away from the range extender module;
   a cabin module including a heating circuit for transferring heat to the vehicle cabin;
   a first thermal coupling element connected to the cooling circuit of the range extender module;
   a second thermal coupling element connected to the heating circuit of the cabin module; and
   wherein the first thermal coupling element mates with the second thermally coupling element for conducting heat therebetween.

2. The system of claim 1, wherein the range extender module is a rear axle module.

3. The system of claim 1, wherein the range extender module is coupled to the cabin module via a DC/DC connection.

4. The system of claim 1, wherein the first thermal coupling element is a rear thermal coupling element and the second thermal coupling element is a front thermal coupling element, and the rear thermal coupling element is disposed rearward relative to the front thermal coupling element.

5. The system of claim 1, wherein the range extender module includes a combustion engine.

6. The system of claim 5, wherein waste heat generated by the combustion engine is transferred to the cooling circuit of the range extender module and is further transferred to the heating circuit of the cabin module.

7. The system of claim 1, wherein the first thermal coupling element and the second thermal coupling element are solid bodies and are joined together.

8. The system of claim 1, wherein heat is transferred between the first and second thermal coupling elements via thermal contact conductance.

9. The system of claim 1, wherein the first thermal coupling element is adjustable relative to the range extender module to accommodate coupling with the second thermal coupling element.

10. The system of claim 1, wherein a coupling surface of the second thermal coupling element is larger than a coupling surface of the first thermal coupling element.

11. A method for transferring waste heat from a range extender module to a cabin module, the method comprising the steps of:
    generating waste heat in a range extender module of an electric vehicle;
    cycling the waste heat through a cooling circuit of the range extender module;
    transferring the waste heat from the cooling circuit to a heating circuit of a cabin module of the vehicle, where the heat is transferred via a thermal coupling between the cooling circuit and the heating circuit; and
    heating the heating circuit in response to transferring the waste heat.

12. The method of claim 11, further comprising transferring heat from the cooling circuit to the heating circuit via thermal contact conductance.

13. The method of claim 11, further comprising operating an internal combustion engine of the range extender module to generate the waste heat.

14. The method of claim 11, wherein the range extender module is a rear axle module.

15. The method of claim 11, wherein the ranger extender module includes a first thermal coupling element and the cabin module includes a second thermal coupling element.

16. The method of claim 15, further comprising attaching the first thermal coupling element to the second thermal coupling element.

17. The method of claim 15, further comprising adjusting the first thermal coupling element relative to the range extender module and aligning the first thermal coupling element with the second thermal coupling element.

18. The method of claim 15, wherein a coupling surface of the second thermal coupling element is greater than the coupling surface of the first thermal coupling element.

19. The method of claim 11, further comprising cycling the heat in the heating circuit through the cabin module.

20. A thermal coupling system between a range extender module and a cabin module, the system comprising:
    a range extender module including a cooling circuit for transferring heat away from the range extender module;
    a cabin module including a heating circuit for transferring heat to the vehicle cabin;
    a thermal coupling connection between the cooling circuit of the range extender module and the heating circuit of the cabin module;
    wherein the thermal coupling connection conducts heat from the cooling circuit to the heating circuit when waste heat from the range extender module is cycled through the cooling circuit.

* * * * *